United States Patent [19]

Nishii

[11] Patent Number: 5,015,045
[45] Date of Patent: May 14, 1991

[54] HYDRAULIC BRAKING SYSTEM
[75] Inventor: Michiharu Nishii, Aichi, Japan
[73] Assignee: Aisin Seiki Kabushiki Kaisha, Aichi, Japan
[21] Appl. No.: 415,790
[22] Filed: Oct. 2, 1989
[30] Foreign Application Priority Data Sep. 30, 1988 [JP] Japan ................. 63-248496

[51] Int. Cl.⁵ .......................... B60T 13/12; B60T 8/48
[52] U.S. Cl. ..................................... 303/114; 303/119
[58] Field of Search .............. 303/113, 114, 119, 84.1, 303/115

[56] References Cited

U.S. PATENT DOCUMENTS

| 4,730,879 | 3/1988 | Adachi et al. | 303/114 |
| 4,750,788 | 6/1988 | Seibert et al. | 303/114 |
| 4,800,289 | 1/1989 | Adachi et al. | 303/119 |

FOREIGN PATENT DOCUMENTS

| 218752 | 9/1987 | United Kingdom | 303/114 |
| 2218766 | 11/1989 | United Kingdom | 303/114 |

Primary Examiner—Matthew C. Graham
Attorney, Agent, or Firm—Burns, Doane, Swecker & Mathis

[57] ABSTRACT

A hydraulic braking system is provided in which the speed of increase of the hydraulic pressure to the wheel cylinders is controlled so that appropriate braking force is ensured while at the same type preventing the road wheels from being positioned in a lock-up condition. In order to provide for such an operation, the locking condition of the road wheels may be detected during braking operation and the anti-lock control system operated so that changeover valves are positioned by a control system so that output pressure of a hydraulic booster is applied to the anti-lock control valves and to the flow control valves so as to appropriately changeover between one of two operating positions in response to the locking condition of the road wheel. In order to provide for such fluid communication of the braking system, a multi-stage orifice arrangement is provided in connection with the anti-lock control valves and the flow control valves.

8 Claims, 2 Drawing Sheets

HYDRAULIC BRAKING SYSTEM

BACKGROUND OF THE INVENTION

1. Field of the Invention

The present invention relates to a braking system for use in an automotive vehicle and particularly to a hydraulic braking system comprising an anti-lock control apparatus.

2. Description of the Prior Art

In a conventional service braking system for an automotive vehicle, a hydraulic pressure generator which generates a braking pressure in response to depression of a brake pedal is used for supplying a prescribed braking pressure with the wheel brake cylinders operating the braking device mounted on each road wheel. There are two types of hydraulic pressure generators. One is a master cylinder which generates a braking pressure in response to depression of the brake pedal as an input to the brake fluid of a reservoir, what is called, a static hydraulic pressure generator. Another is a dynamic hydraulic pressure generator which has a power source and generates a braking pressure regulated in response to depression of the brake pedal as an input to the hydraulic power pressure of the power pressure source.

As to the dynamic hydraulic pressure generator, in recent years, with employment of a hydraulic booster, namely a booster which actuates the master cylinder by the hydraulic power pressure supplied from the power pressure source in response to depression of the brake pedal, the hydraulic output pressure of this hydraulic booster is directly applied to the wheel cylinders of the road wheels. With popularization of a device for preventing a slip due to locking of the road wheels in braking operation, i.e., an anti-lock control apparatus, it has been proposed to use the hydraulic output pressure of the hydraulic booster as a control pressure of the anti-lock control apparatus, namely to use the hydraulic booster as a supplementary pressure source, as disclosed in Japanese Patent Publication No. 56-10219 published in 1981.

On the contrary, the art which prevents the pressure change of the hydraulic booster in anti-lock control operation is disclosed in Japanese Patent Laid-Open Publication No. 62-166150 published in 1987. Namely, a regulator, as a supplementary pressure source provided in the system, regulates the hydraulic output pressure of the power pressure source in response to the hydraulic output pressure of the master cylinder and outputs the regulated pressure. Furthermore, the changeover valves which apply the hydraulic output pressure of the regulator to the wheel cylinders in the anti-lock control operating condition and block the introduction of the hydraulic output pressure of the regulator into the wheel cylinders in normal condition are disposed between the anti-lock control valves and the master cylinder.

In the above related art, the orifice means for restricting fluid communication is disposed in the hydraulic conduit between the supplementary pressure source and the wheel cylinders in order to be indicative of the rising speed of the hydraulic pressure of the wheel cylinders in the anti-lock operation. This orifice means is generally incorporated in the solenoid valves such as the flow control valve shown in the above Japanese Patent Laid-Open Publication No. 62-166150, and the restriction (orifice) is not only formed in the restriction side but also is formed in the free communication side in general and furthermore a small restriction (orifice) is formed in the anti-lock control valves which are position in the master cylinder side in regard to the flow control valves.

As mentioned above, these flow control valves and the anti-lock control valves are connected to the master cylinder via the changeover valves.

Accordingly, the hydraulic output pressure of the master cylinder is supplied to the wheel cylinders via the anti-lock control valves and the flow control valves in the conventional braking operation, and the rising speed of the hydraulic pressure of the wheel cylinders is dropped by the restriction (orifice) of these valves and there is in danger of the generation of a bad brake feeling. In order to solve this drawback, it is thought to provide parallel bypass valves in regard to the anti-lock control valves and the flow control valves. In this bypass valve system, however, the disposition of the hydraulic conduit is complicated and the braking system becomes large. It has also been thought to form the restriction (orifice) in only the passage of the anti-lock control side of the changeover valves which are positioned in the master cylinder side in regard to the anti-lock control valve and the flow control valve without forming the restriction (orifice) in the anti-lock control valves and the passage of the flow control valve in the normal condition. In this arrangement, however, the changeover valves become large in mass, and the many adjusting factors exists among the valves so that it is difficult to design this system. Furthermore, the manufacturing cost is increased.

SUMMARY OF THE INVENTION

Accordingly, it is an object of the present invention to provide a hydraulic braking system wherein the rising speed of the hydraulic pressure of the wheel cylinders is proper to each suitable rising speed or speed of increase of the hydraulic pressure in the conventional braking operation and the anti-lock control operation with a simple structure and without increasing the manufacturing cost.

It is another object of the present invention to provide a hydraulic braking system wherein the feel of the brake is improved with a simple structure.

It is a further object of the present invention to provide a hydraulic braking system wherein it is able to easily adjust the rising speed of the hydraulic pressure.

It is a further object of the present invention to provide an improved hydraulic braking system which includes a hydraulic pressure generator for generating a hydraulic braking pressure in response to depression of a brake pedal, a plurality of wheel cylinders communicating with the hydraulic pressure generator via the hydraulic conduits of a plurality of circuits, an anti-lock control apparatus disposed between the hydraulic pressure generator and the wheel cylinder of at least one circuit and communicating with a supplementary pressure source via at least one orifice means and regulating the hydraulic pressure of the wheel cylinders of at least one circuit in response to the locking condition of the road wheels, and a changeover valve disposed between the wheel cylinders of at least one circuit and the orifice means and selectively changed over between a first operation position for communicating the wheel cylinders of at least one circuit with the hydraulic pressure generator and for blocking the communication to the orifice means in the conventional braking operation and a second operation position for blocking the wheel cylinders of at least one circuit from the hydraulic pressure generator and for communicating with the orifice means in the anti-lock control operation.

In the above-described hydraulic braking system, the orifice means comprises a multistage orifice in which a plurality of orifices are connected in series.

Furthermore, in the above-described hydraulic braking system, a master cylinder may be a hydraulic pressure generator and a hydraulic booster may be a supplementary pressure source.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A hydraulic braking system constituted in accordance with preferred embodiments of the present invention will be described with reference to the drawings.

Figure 1:
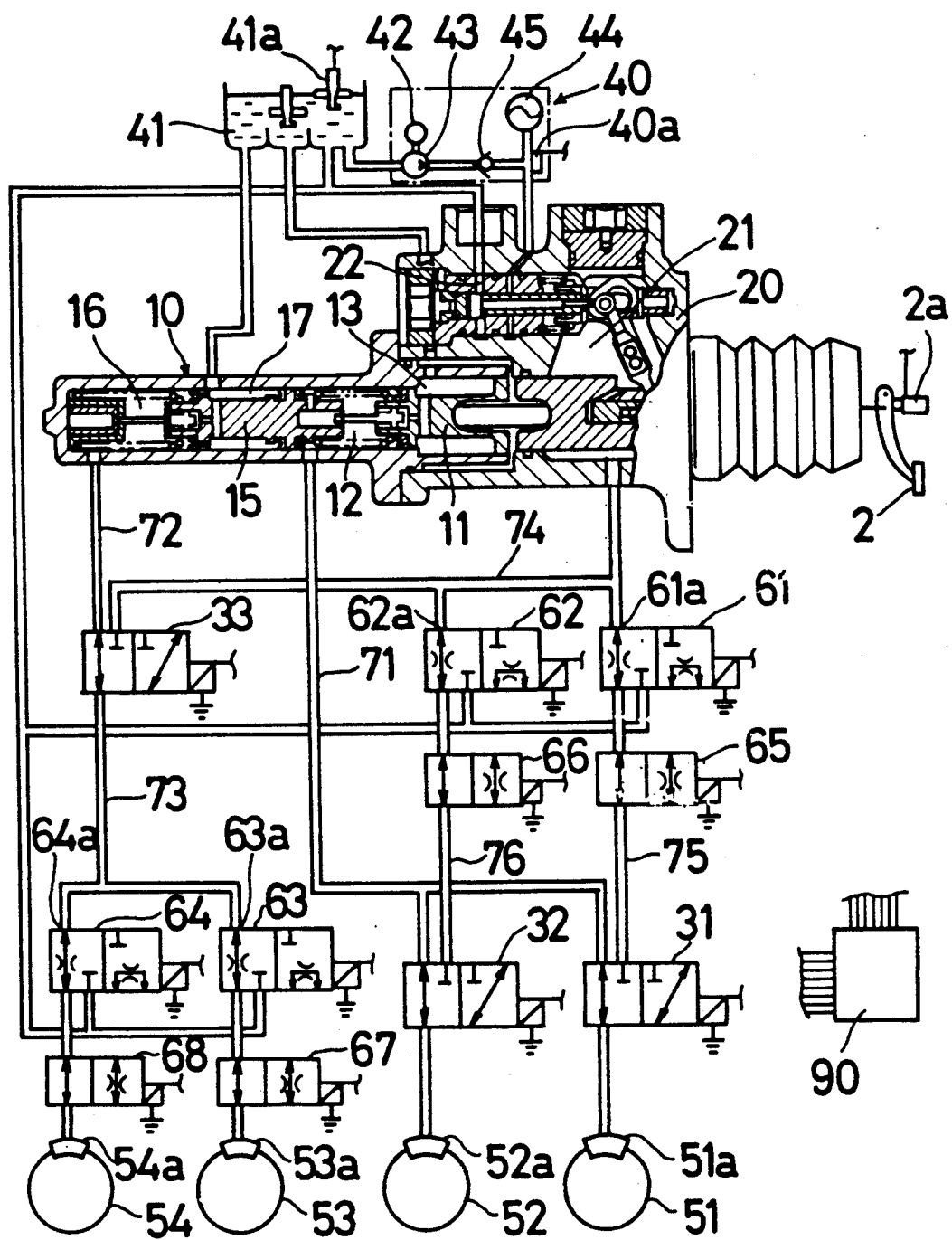
FIG. 1 is a schematic diagram of an one embodiment of a hydraulic braking system according to the present invention.

Referring to FIG. 1, there is schematically illustrated a hydraulic pressure generator which includes a tandem master cylinder 10 (hereinafter, a master cylinder) and a hydraulic booster 20. In this embodiment, the hydraulic booster 20 is used as a supplementary pressure source. As a result, a depression force applied on a brake pedal 2 is transmitted as brake operating force to the hydraulic booster 20, and in response to this brake operating force, hydraulic pressure introduced from a power pressure source 40 or a reservoir 41 is appropriately regulated and applied to wheel cylinders 51a and 52a (53a and 54a) of front road wheels 51 and 52 (rear road wheels 53 and 54) through a first hydraulic conduit 71 (a second hydraulic conduit 72).

The master cylinder 10 has a well-known portless type structure. The master cylinder 10 has a first piston 11 and a second piston 15 slidably and fluid-tightly fitted in a bore and forming a first fluid chamber 13, a first pressure chamber 12, a second fluid chamber 17 and a second pressure chamber 16 in the bore. The brake fluid supplied from the reservoir 41 is introduced from a first or second fluid chamber 13 or 17 to a first or second pressure chamber 12 or 16, and the communication between the first fluid chamber 13 and the first pressure chamber 12 is blocked by a well-known valve mechanism and the volume of the first pressure chamber 12 is decreased when the first piston 11 is moved in response to depression of the brake pedal 2. As a result, the hydraulic braking pressure is applied to the first hydraulic conduit 71. At the same time, the communication between the second fluid chamber 17 and the second pressure chamber 16 is blocked by a well-known valve mechanism and the volume of the second pressure chamber 16 is decreased when the first piston 11 is moved in response to depression of the brake pedal 2. As a result, the hydraulic braking pressure is applied to the second hydraulic conduit 72.

The hydraulic booster 20 introduces the hydraulic power pressure supplied from the power pressure source 40 into a boost chamber 21 and regulates the hydraulic power pressure in response to depression of the brake pedal 2. The hydraulic booster 20 actuates the master cylinder 10 by the hydraulic power pressure supplied from the power pressure source 40 in response to depression of the brake pedal 2. In this embodiment, the hydraulic booster 20 is the spool-valve type actuated by a lever, but other well-known types may be used. The boost chamber 21 is connected with the reservoir 41 via a port 22 and the superfluous brake fluid is returned to the reservoir 41 when the hydraulic booster 20 is stopped and controls the hydraulic power pressure in the boost chamber 21 to the prescribed or predetermined boost pressure.

The power pressure source 40 comprises an accumulator 44 for generating a hydraulic power pressure along with a fluid pump 43 which is connected to the accumulator 44 via a check valve 45 and connected to the reservoir 41 which stores an amount of hydraulic fluid. The power source 40 is constituted so as to supply the power hydraulic pressure to the necessary ports via the accumulator 44. The fluid pump 43 is operated by a motor 42 which is actuated by an electric control signal from an electric control device 90. The power hydraulic pressure is maintained to the predetermined value by intermittently controlling the motor by the electric control device in response to the electric control signal from a pressure sensor 40a. Reference numeral 40b represents a fluid quantity sensor.

The first pressure chamber 12 of the master cylinder 10 is communicated with the wheel cylinders 51a, 52a of the front road wheel 51, 52 via the first hydraulic conduit 71 and changeover valves 31, 32, respectively. The second pressure chamber 16 of the master cylinder 10 is communicated with the wheel cylinders 53a, 54a of the rear road wheel 53, 54 via the second hydraulic conduit 72, a changeover valve 33, a third hydraulic conduit 73, anti-lock control valves 63, 64 and control valves 67, 68, respectively.

The boost chamber 21 of the hydraulic booster 20 is communicated with anti-lock control valves 61, 62 and flow control valves 65, 66 via a fourth hydraulic conduit 74 and is communicated with changeover valves 31, 32 via a fifth hydraulic conduit 75 and a sixth hydraulic conduit 76, respectively. Namely, the front road wheels side 51, 52 is divided into two circuits and the anti-lock control valves 61, 62, the flow control valves 65, 66 and the changeover valves 31, 32 are disposed in each circuit, respectively.

The changeover valves 31, 32 are three port-two position solenoid operation directional control valves arranged to be energized in response to the electric control signal from the electric control device 90. The changeover valves 31, 32 are selectively placed in one of a first operating position and a second operating position. In its first operating position or its normal position (disenergized position), the first pressure chamber 12 of the master cylinder 10 is communicated with the wheel cylinders 51a, 52a and the wheel cylinders 51a, 52a are blocked from the flow control valves 65, 66, respectively. In its second operating position or its energized position, the wheel cylinders 51a, 52a are communicated with the flow control valves 65, 66, respectively, and are blocked from the first pressure chamber 12 of the master cylinder 10.

The changeover valve 33 is a three port-two position solenoid operated directional control valve arranged to be energized in response to the electric control signal from the electric control device 90. The changeover valve 33 is selectively placed in one of a first operating position and a second operating position. In its first operating position or its normal position (disenergized position), the second hydraulic conduit 72 is communicated with the third hydraulic conduit 73 and the third hydraulic conduit 73 is blocked from the boost chamber 21, so that the second pressure chamber 16 of the master cylinder 10 is communicated with the anti-lock control valves 63, 64. In its second operating position or its energized position, the anti-lock control valves 63, 64 are blocked from the second pressure chamber 16 of the master cylinder 10.

The anti-lock control valves 61 to 64 and the flow control valves 65 to 68 constitute the anti-lock control apparatus and each solenoid is electrically connected with the electric control device 90. The electric control device 90 comprises a micro-computer and inputs electric detection signals from rotational speed sensors (not shown) of the road wheels, the pressure sensor 40a, the fluid quantity sensor 40B, and brake pedal switch 2a so that the electric control device 90 operates the various control including the above control of the motor 42 of the power pressure source 40.

The changeover valves 31, 32 and 33 are controlled in their changing of position by the electric control device 90 and are positioned to their second operating position (energized position) in the anti-lock control operation. In the anti-lock control operation, the locking conditions of the front road wheels 51, 52 and the rear road wheels 53, 54 are detected and the anti-lock control valves 61 to 64 and the flow control valves 65 to 68 are appropriately controlled by the electric control device 90, so that the locking of each road wheel is prevented.

The anti-lock control valves 61 to 64 are three port-two position solenoid operated directional control valves arranged to be energized in response to the electric control signal from the electric control device 90. The anti-lock control valves 61 to 64 are selectively placed in one of a first operating position and a second operating position. In its first operating position or its normal position (disenergized position), their inlet ports 61a to 64a are communicated with the flow control valves 65 to 68, respectively. In its second operating position or its energized position, their inlet ports 61a to 64a are blocked and the flow control valves 65 to 68 are communicated with the reservoir 41. In each anti-lock control valve 61, 62, 63 and 64, an orifice is provided in each passage therein as shown by a mark in FIG. 1. Namely, the orifice means of the present invention are provided in each anti-lock control valve 61, 62, 63 and 64, and the rising speed or speed of increase of the hydraulic pressure of the wheel cylinders 51a to 54a in the anti-lock control operation are appropriately regulated.

The flow control valves 65 to 68 are two port-two position solenoid operated directional control valves arranged to be energized in response to the electric control signal from the electric control device 90. The flow control valves 65 to 68 are selectively placed in one of a first operating position and a second operating position. In its first operating position or its normal position (disenergized position), the anti-lock control valves 61 to 64 are communicated with the wheel cylinders 51a to 54a without restricting the fluid communication so as to transmit the hydraulic pressure from the anti-lock control valves 61 to 64. In its second operating position or its energized position, the anti-lock control valves 61 to 64 are communicated with the wheel cylinders 51a to 54a so as to restrict the fluid communication so as to delay the speed of the hydraulic pressure of the wheel cylinders 51a to 54a. It should be noted that a small orifice is provided in the passage of the first position and the first position is functionally the same as the relation when there is no orifice in the second position.

As mentioned above, in this embodiment, the two circuits of the wheel cylinders 51a, 52a of the front road wheels 51, 52 are connected with the hydraulic booster 20 as the supplementary pressure source via the orifices of the anti-lock control valves 61, 62 and the flow control valves 65, 66, namely the orifice means, respectively. The changeover valves 31, 32 are disposed between the wheel cylinders 52a, 52a and the flow control valves 65, 66, respectively and are connected with the first pressure chamber 12 of the master cylinder 10. Thereby, the wheel cylinders 51a, 52a are communicated with the first pressure chamber 12 of the master cylinder 10 via the changeover valves 31, 32 in normal condition. On the contrary, in the circuit of the wheel cylinders 53a, 54a of the rear road wheels 53, 54, the changeover valve 33 is disposed between the anti-lock control valves 63, 64 and the second pressure chamber 16 of the master cylinder 10 as in the related art and the wheel cylinders 53a, 54a are communicated with the second pressure chamber 16 of the master cylinder 10 via the flow control valves 67, 68, the anti-lock control valves 63, 64 and the changeover valve 33 in normal condition.

The above-described embodiment of the hydraulic braking system operates as follows. In the normal braking operation, each valve is placed in the position shown in FIG. 1, respectively. Therefore, the hydraulic output pressure of the first pressure chamber 12, of the master cylinder 10 is applied to the wheel cylinders 51a, 52a of the front road wheels 51, 52 without passing through the orifice and the appropriate braking operation is obtained. At this time, the second pressure chamber 16 of the master cylinder 10 is communicated with the wheel cylinder 53a, 54a of the rear road wheels 53, 54 via the orifices of the anti-lock control valves 63, 64 and the flow control valves 67, 68, but these orifices are regulated so as to not deteriorate the brake feeling in view of the relation of the distribution of the braking force between the front road wheel 51, 52 side and the rear road wheel 53, 54 side, or the relation between the changeover valve 33 and the orifices of the anti-lock control valves 63, 64 and the flow control valves 67, 68.

When the locking condition of the road wheels is detected in the braking operation and the anti-lock control is operated, the changeover valves 31 to 33 are changed over to their second operating position by the electric control device 90. Thereby, the hydraulic output pressure of the hydraulic booster 20 is applied to the anti-lock control valves 61 to 64 and the flow control valves 65 to 68 and the anti-lock control valves 61 to 64 and the flow control valves 65 to 68 are appropriately changed over between two operating positions in response to the locking condition of the road wheels. Therefore, the hydraulic pressure of the wheel cylinders 51a to 54a are appropriately regulated and the road wheels are prevented from assuming the locking condition, so that appropriate braking force is ensured.

Figure 2:
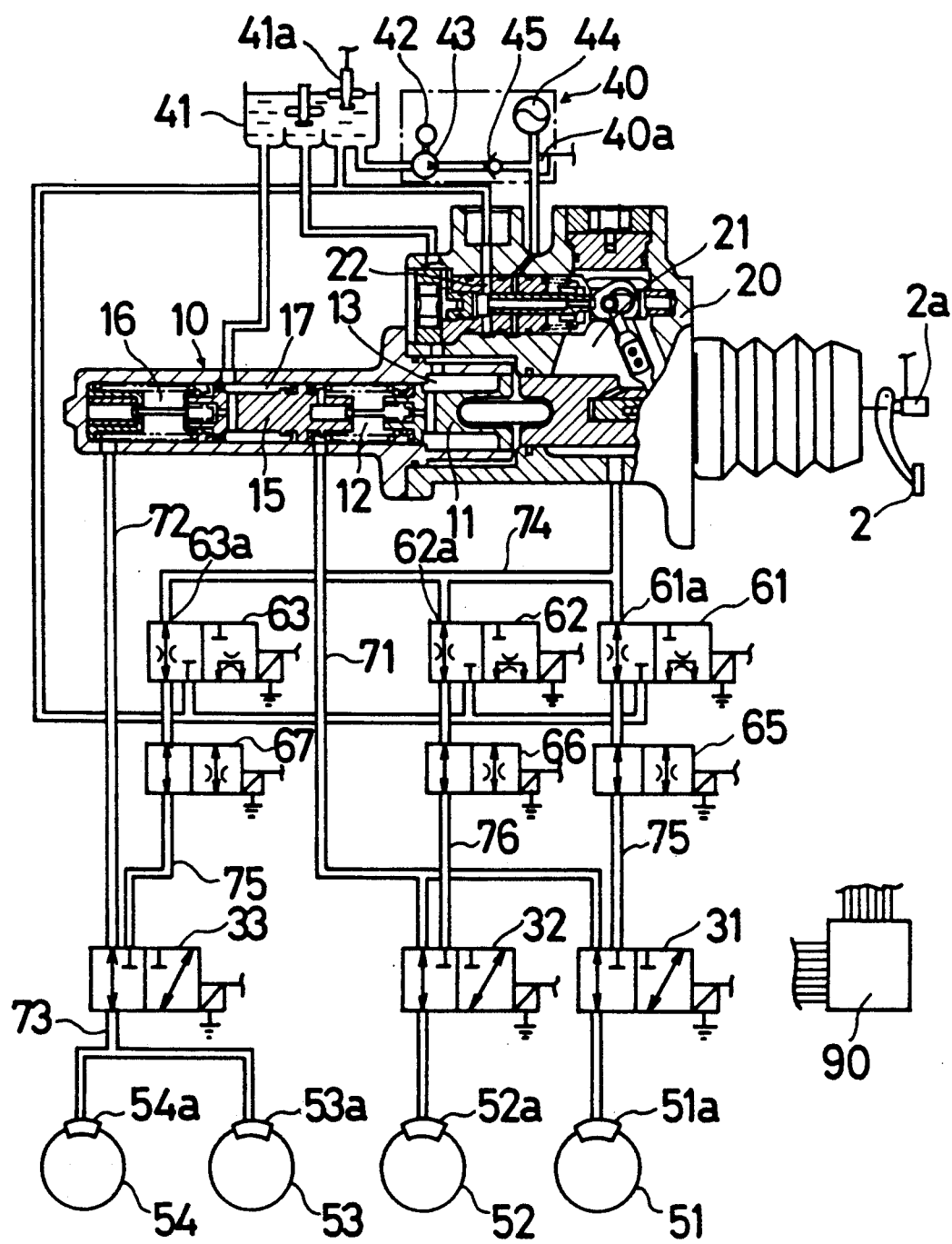
FIG. 2 is a schematic diagram of another embodiment of a hydraulic braking system according to the present invention.

FIG. 2 shows another embodiment of the present invention. In the FIG. 2, the same parts as compared with FIG. 1 are provided with the same reference numeral.

In this embodiment, the wheel cylinders 53a, 54a are in one circuit and are communicated with the second pressure chamber 16 of the master cylinder 10 via only the changeover valve 33. The other structure is the same as the structure of the embodiment shown by FIG. 1. Namely, in this embodiment, the anti-lock control valve 64 and the flow control valve 68 are removed as compared with FIG. 1 and only the anti-lock control valve 63 and the flow control valve 67 are disposed between the changeover valve 33 and the boost chamber 21 of the hydraulic booster 20. Therefore, the changeover valve 33 is positioned in the downstream side of the anti-lock control valve 64 and the flow-control valve 67 and is disposed between the wheel cylinders 53a, 54a and the orifices formed in the anti-lock control valve 64 and the flow-control valve 67 as same as the front road wheels 51, 52 side.

Accordingly, in the normal braking operation, the hydraulic output pressure of the second pressure chamber 16 of the master cylinder 10 is directly applied to the wheel cylinders 53a, 54a by the changeover valve 33 without passing through the orifice. As such, it is unnecessary to fear the influence in regard to the increasing speed of the hydraulic pressure of the wheel cylinders 53a, 54a which would otherwise necessitate the controlling with each road wheel the respective cylinders so as to regulate their hydraulic pressure by the anti-lock control valve 63 and the flow control valve 67. This permits a reduction in the number of solenoid operated directional control valves as compared with FIG. 1 and a concurrent reduction in the manufacturing cost. The structure of the rear road wheels 53, 54 side may be same as the structure of the front road wheels 51, 52 side. Since the operation of these valves are same as the operation of the embodiment shown in FIG. 1, a detailed description is omited.

In the above embodiments shown in FIG. 1 and FIG. 2, the orifice assumes the form of the double-stage series connection in which the orifice of the anti-lock control valves 61 to 64 are connected with the orifice of the flow control valves 65 to 67 so as to constitute the multistage orifice. Therefore, speed of increase of the hydraulic pressure of the wheel cylinders 51a to 54a is easily regulated. Now, on the contrary, a pair of the anti-lock control valves 61 to 64 and the flow control valves 65 to 68 may be exchanged to a three port-three position solenoid operated directional control valve and the anti-lock control apparatus may be constituted by the three port-three position solenoid operated directional control valve and the changeover valves 31 to 33. According to this arrangement, the three port-three position solenoid operated directional control valves are selectively placed in one of a first operating position, a second operating position and a third operating position. In its first operating position or its normal position (disenergized position), the wheel cylinders 51a to 54a are communicated with the boost chamber 21 of the hydraulic booster 20 in the anti-lock control operation. In its second operating position or its energized position, the wheel cylinders 51a to 54a are sealed and the hydraulic pressure of the wheel cylinders 51a to 54a are held in the anti-lock control operation. In its third operating position or its energized position, the wheel cylinders 51a to 54a are communicated with the reservoir 41. Accordingly, in the anti-lock control operation, the three port-three position solenoid operated directional control valves are appropriately changed over among three positions and the hydraulic pressure of the wheel cylinders 51a to 54a are appropriately regulated. In this case, the orifices are formed in these control valves, but if the changeover valves are disposed between these control valves and the wheel cylinders, respectively, the fluid communication in normal braking operation is not influenced by the orifices and the hydraulic pressure is supplied to the wheel cylinders with appropriate increasing speed.

In the above embodiments, the hydraulic pressure generator is constituted by the master cylinder 10. However, it is able to provide the hydraulic pressure generator by the dynamic hydraulic pressure generator which comprises the regulator.

Furthermore, in the above embodiments, the orifice arrangements are provided in the anti-lock control valves 61 to 64 and the flow control valves 65 to 68. However, the orifice arrangements can be disposed outside of each of the valves in the hydraulic conduits.

As mentioned above, according to the present invention, since the changeover valve which operates in the anti-lock control operation is disposed between the wheel cylinders of at least one circuit and the orifice means of the anti-lock control apparatus, the rising speed or increase of the hydraulic pressure of the wheel cylinders is appropriately regulated by the orifice arrangements in the anti-lock control operation. On the contrary, since the hydraulic output pressure of the hydraulic pressure generator is directly applied to the wheel cylinders without passing through the orifice arrangements in normal braking operation, the braking operation is obtained without lowering the rising speed or speed of increase of the hydraulic pressure of the wheel cylinders. Therefore, in the anti-lock control operation and the normal braking operation, the hydraulic pressure of the wheel cylinders is regulated with the suitable rising speed or speed of increase of the hydraulic pressure, respectively, so as to ensure good brake feeling. Furthermore, since this control is obtained by a simple structure, namely by means of disposition of the changeover valve, as above mentioned, in regard to prior hydraulic braking system having the anti-lock control apparatus, it is easily manufactured without increasing the manufacturing cost.

In case that the orifice arrangement of the anti-lock control apparatus comprises the multiple orifices, the rising speed or speed of increase of the hydraulic pressure of the wheel cylinders in the anti-lock control operation and the normal braking operation is easily regulated. On the contrary, in the related art, it is difficult to appropriately regulate the rising speed of the hydraulic pressure of the wheel cylinders in the normal braking operation.

Furthermore, according to the present invention, if the hydraulic booster is used as the supplementary pressure source, it is unnecessary to provide the hydraulic pressure generator in addition and the size of the hydraulic braking system is decreased.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic braking system comprising;
   a hydraulic pressure generator means for generating a hydraulic braking pressure in response to depression of a brake pedal,
   a plurality of wheel cylinders communicating with the hydraulic pressure generator via at least one hydraulic conduit of a plurality of circuits,
   an anti-lock control apparatus disposed between the hydraulic pressure generator and a wheel cylinder of at least one of said plurality of circuits and communicating with a supplementary pressure source via at least one orifice means and regulating the hydraulic pressure supplied to the wheel cylinder of at least one circuit of said plurality of circuits to prevent a locking condition of the road wheels by selective change over between a first operation position and a second operation position, and
   a changeover valve disposed between the wheel cylinder of at least one circuit of said plurality of circuits and the orifice means and selectively changed over between a first operation position for communicating the wheel cylinder of at least one circuit of said plurality of circuits with the hydraulic pressure generator and for blocking the communication to the orifice means in the conventional braking operation so that the hydraulic pressure from the hydraulic pressure generator is supplied directly to the wheel cylinder via the changeover valve independent of the operation position of the anti-lock-control apparatus, and a second operation position for blocking the wheel cylinder from the hydraulic pressure generator and for communicating with the orifice means in the anti-lock control operation.

2. A hydraulic braking system as recited in claim 1, wherein the orifice means comprises a multistage orifice in which a plurality of orifices are connected in series.

3. A hydraulic braking system as recited in claim 2, wherein the hydraulic pressure generator comprises a master cylinder.

4. A hydraulic braking system as recited in claim 2, wherein the supplementary pressure source comprises a hydraulic booster.

5. A hydraulic braking system as recited in claim 1, wherein the hydraulic pressure generator comprises a master cylinder.

6. A hydraulic braking system as recited in claim 5, wherein the supplementary pressure source comprises a hydraulic booster.

7. A hydraulic braking system as recited in claim 1, wherein the supplementary pressure source comprises a hydraulic booster.

8. A hydraulic braking system comprising;
   a hydraulic pressure generator means for generating a hydraulic braking pressure in response to depression of a brake pedal,
   a plurality of wheel cylinders communicating with the hydraulic pressure generator via at least one hydraulic conduit of a plurality of circuits,
   an anti-lock control apparatus disposed between the hydraulic pressure generator and a wheel cylinder of at least one of said plurality of circuits and communicating with a supplementary pressure source via at least one orifice means and regulating the hydraulic pressure supplied to the wheel cylinder of at least one circuit of said plurality of circuits to prevent a locking condition of the road wheels by selective change over between a first operation position and a second operation position,
   a changeover valve disposed between the wheel cylinder of at least one circuit of said plurality of circuits and the orifice means and selectively changed over between a first operation position for communicating the wheel cylinder of at least one circuit of said plurality of circuits with the hydraulic pressure generator and for blocking the communication to the orifice means in the conventional braking operation and a second operation position for blocking the wheel cylinder from the hydraulic pressure generator and for communicating with the orifice means in the anti-lock control operation, and
   control means for controlling said anti-lock control apparatus and said changeover valve to change said changeover valve from its first operation position to its second operation position in response to a locking condition of the road wheels and to change said anti-lock control apparatus between its first and second operation positions when said changeover valve is in its second operation position.

* * * * *